United States Patent [19]
Giorgi

[11] 3,772,106
[45] Nov. 13, 1973

[54] PROCESS OF MAKING TRIDIMENSIONAL COLOR PHOTOGRAPHS

[76] Inventor: Lewis A. Giorgi, 286 New Main St., Yonkers, N.Y. 10701

[22] Filed: Aug. 10, 1971

[21] Appl. No.: 170,433

[52] U.S. Cl. .................. 156/58, 95/1 R, 156/59, 355/133
[51] Int. Cl. .............................. B44c 1/20
[58] Field of Search .............. 156/58, 59; 355/91, 355/133; 264/7

[56] References Cited
UNITED STATES PATENTS

| | | | |
|---|---|---|---|
| 1,604,319 | 10/1926 | Rozgonyi | 156/59 |
| 2,652,326 | 9/1953 | Ogle | 95/2 |
| 3,298,881 | 1/1967 | Higler et al. | 156/59 |

Primary Examiner—Edward G. Whitby
Attorney—Jacobs & Jacobs

[57] ABSTRACT

Life-like, natural-appearing relief colored photographs of persons, scenes, paintings, murals, etc. are made by a process herein called photoreliefography, which comprises molding an impasto on a black and white positive photoprint to provide merging raised and depressed contoured surfaces corresponding to the subject of the photoprint and on which a wet color photograph of the same subject is placed in registration and conformed to the molded impasto which is then dried in stages and cured for permanence. The completed studio photograph is protected by a coating of transparent lacquer.

8 Claims, 12 Drawing Figures

Patented Nov. 13, 1973
3,772,106
3 Sheets-Sheet 1
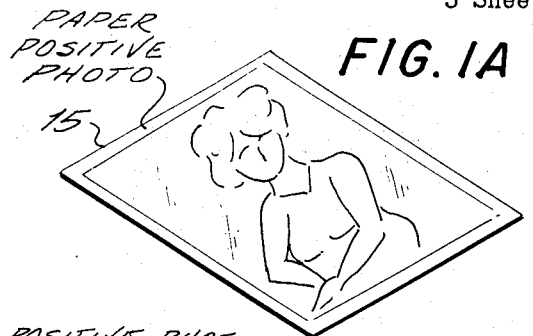
FIG. 1A
FIG. 1C
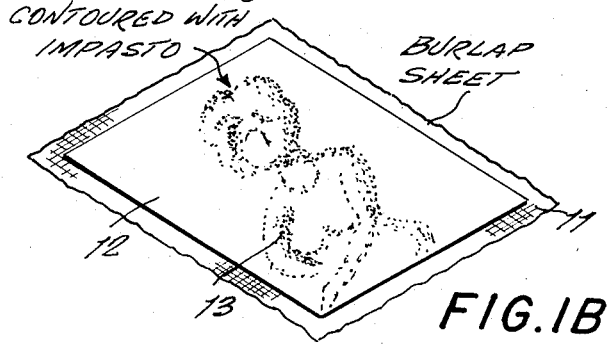
FIG. 1B
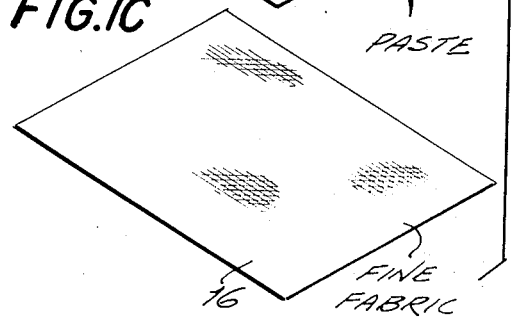
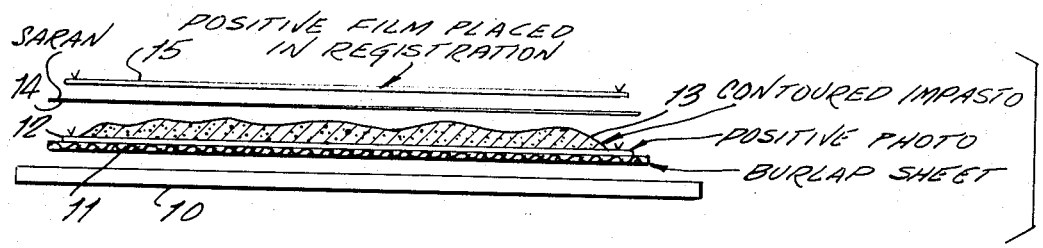
FIG. 2
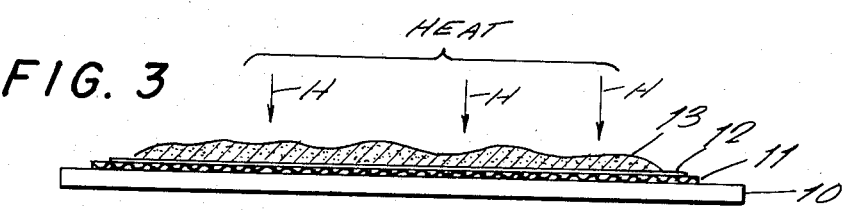
FIG. 3
INVENTOR.
LEWIS A. GIORGI
BY Jacobs & Jacobs
ATTORNEYS

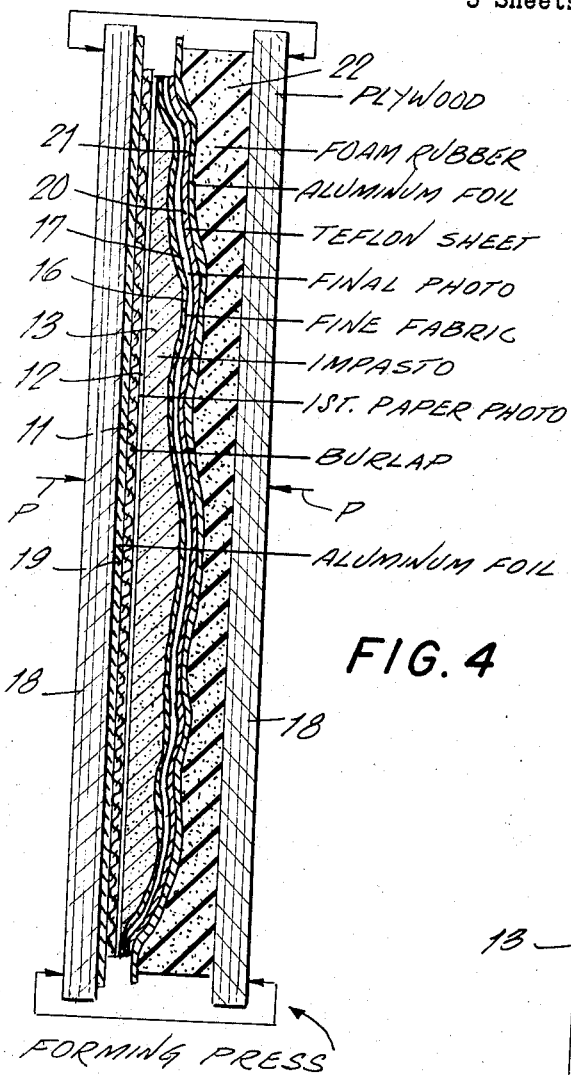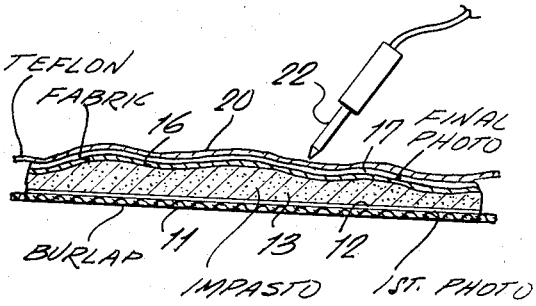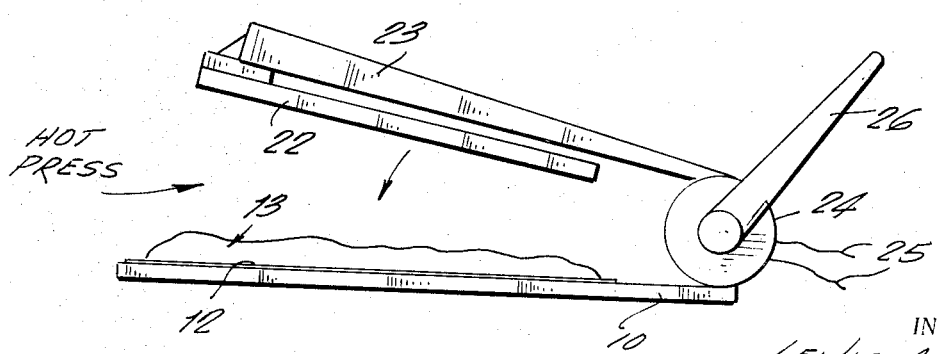

Patented Nov. 13, 1973

INVENTOR.
LEWIS A. GIORGI
BY Jacobs ; Jacobs

ATTORNEYS

PROCESS OF MAKING TRIDIMENSIONAL COLOR PHOTOGRAPHS

This invention relates to life-like or natural-appearing, tridimensional, colored photographs or scenes made by shaping and contouring in a succession of steps a pliable, moldable material, herein called impasto, on a planar black and white photograph of a subject or scene to provide raised and depressed areas with merging surfaces on which a wet colored photograph of the same subject or scene is placed in registration over and conformed to the black and white photograph underlying the shaped impasto which is thereafter subjected to partial drying and additional shaping and finally further drying and curing for permanence. The completed photograph or picture is in relief and is protected with a coating of transparent lacquer.

In the accompanying diagrammatic drawing:

FIGS. 1A, 1B and 1C show the positive photoprints and fabric sheet elements;

FIG. 2 shows the components prior to complete assembly and processing;

FIG. 3 illustrates a subassembly for contouring and applying heat;

FIG. 4 is a section through a complete assembly in a pressure clamp;

FIG. 5 illustrates a form of hot press mold assembly;

FIG. 6 shows a hot iron mode of contouring the moldable material;

FIG. 7 is an elevation or plan of a finished photograph; and

Figure 8:
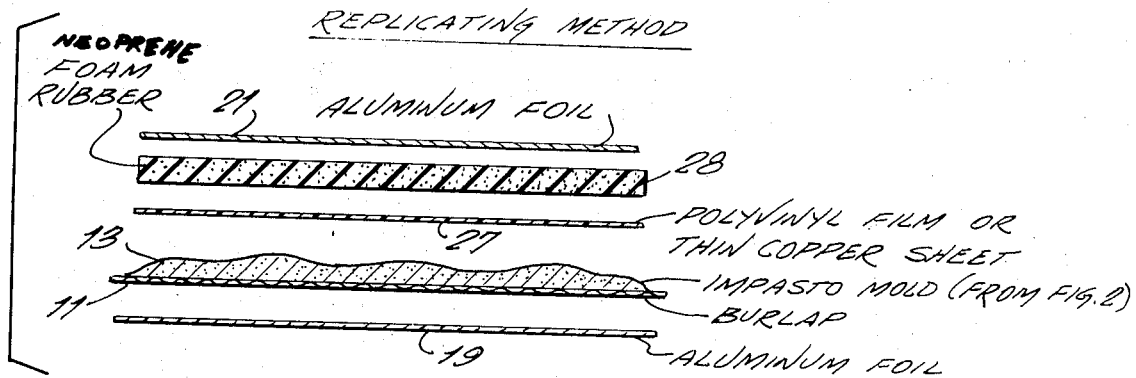
FIGS. 8, 9 and 10 show how replication of a photograph is carried out.

In carrying out the invention, a base material or workboard 10 of adequate thickness and rigidity is used on which to build up the succeeding layers and components to be described. The base material may, for example, be wood, masonite or plywood. There is placed thereon a burlap sheet 11 which is open-meshed and porous to provide good holding power and to which is affixed on the upper surface thereof a black and white photograph 12 of lesser size than the burlap sheet 11 of the subject or scene and this is a positive photograph, not a negative. Depending upon the subject or scene on said positive photograph, a moldable composition hereinafter called impasto 13 is applied which generally follows the shape or outline of the person or objects on the photograph and either by hand or through the use of a trowel or other suitable tool or instrument while wet on the Saran wrap 14 and consequently on top is the transparent positive film 15 in register with paper layer 12 forming a sandwich over each other, the wet impasto is squeezed down sideways and the impasto 13 is given the necessary contours with raised and depressed merging portions corresponding to the curvatures and configurations of the person or scenes on the photograph.

Optionally and where required, further and more accurate contouring is carried out by subjecting the components so far described to mild heat as indicated by the arrows H in FIG. 3 and the then semi-dry impasto is brought into accurate conformity with the shape of the person or scene on the photograph by reapplying film 15 and retooling and after the impasto is dry it is coated with transparent lacquer. The fine fabric sheet 16 and final print 17 may be pasted separately and ironed (see FIG. 6) only around the edges of the contoured impasto before making the assemblage shown in FIG. 4.

The assemblage, together with some additional elements to be described, are placed in a forming press, as shown in FIG. 4 wherein the plywood top and bottom pieces 18 are suitably clamped together (as indicated by arrows P) under pressure in any conventional or well-known manner with the layered components therebetween so that reading from left to right in FIG. 4 there is a plywood base 18 and successively thereon a thin layer of aluminum foil 19, the burlap sheet 11 above referred to, then the first paper black and white photograph 12 on which the shaped and contoured impasto 13 is placed, and over the shaped impasto 13 there is the layer of fine fabric 16, such as a fine-woven linen, then the final (positive print) print or photograph 17 as referred to above on which is placed a Teflon sheet 20 made to conform to the underlying configurations, and upon the Teflon sheet there is another layer of aluminum foil 21 and then the remainder of the space between the last-mentioned aluminum foil layer and the other plywood member 18 is a mass of foam rubber 22 which is subsequently removed but which during the compression stage applies the desirable amount of yielding force without altering the underlying configurations and, as will be further observed from FIG. 4, the surface of the foam rubber in contact with the contoured layers itself conforms to the configurations. The clamped assemblage is allowed to remain for a sufficient time until the thus far completed product has a sufficient amount of permanence to enable it to be removed and further handled or treated, it being understood that at such stage of the procedure the plywood members are unclamped and removed.

It has been found that in some instances it is necessary or preferred to carry out some additional steps, especially where the subject or scene on the black and white photograph is complex or intricate, and when such is the case or when for purposes of imparting a more professional finish to the photograph or scene being produced in relief, a final touch-up contouring using a heated iron rod 22 on a Teflon sheet may be carried out as shown in FIG. 6. The purpose of this is to complete those small final details of contouring necessary to give the final finished appearance and such a finished product is shown at 17 in FIG. 7 and which is completely life-like as to the subject of the studio photograph thus made in that the head, hair, arms and other parts of the person are not only shaped in accordance with the actual proportions of the person but are colored to match the clothing, hair and makeup of the subject, which when otherwise complete is covered with a protective layer of transparent lacquer and then framed.

A hot press mold assembly is shown in FIG. 5 which can take the place of the clamping arrangement in FIG. 4 with a pressure member 22 moved arcuately by plate 23 attached to roll or hinge 24 supplied with heating current by conductors 25 and movable by lever 26. This has the advantage of being simple and fast in operation and to enable variations in pressure exerted on impasto 13 on photograph 12 and base 10, this showing being essentially schematic.

As shown in FIG. 8, arrangements can be made to replicate the completed contoured studio photograph or scene and this is done by (reading from bottom to top) starting with the film of aluminum foil 19, placing the sheet of burlap 11 thereon on which the molded impasto 13 of FIG. 2 rests, and then placing a polyvinyl film or a thin sheet of copper 27 over the contoured impasto and conforming it thereto, following which a comparatively thick block or piece of rubber 28 is placed thereon and then a top layer of the aluminum foil 21 is used and suitable compression applied so that the polyvinyl film or thin copper sheet 27 acquires all the contours and configurations of the shaped impasto and then such shaped polyvinyl film or thin copper sheet is used as a master form to apply to subsequent assemblages with impasto and by suitable pressures the configurations of the polyvinyl film or thin copper sheet are imparted to the shaped impasto, thereby avoiding goind through the sequence of steps above described. This arrangement has the further advantage that if it is desired to change any of the configurations of the impasto before the duplicating polyvinyl film or thin copper sheet is shaped, such can be done and thus replicates of the original studio relief photograph can be readily made, either exactly the same as the original or with any desired minor changes in contouring, coloring, etc.

Figure 9:
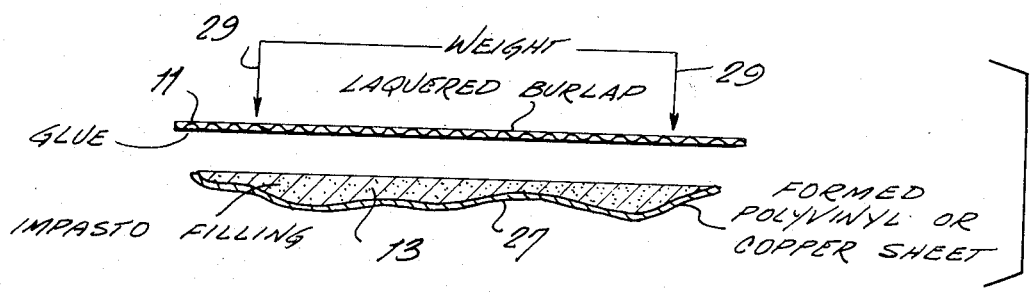
Figure 10:
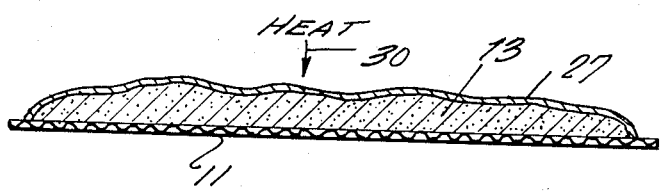

The replications are carried out in a manner which will be understood from FIG. 9 wherein the polyvinyl film or thin copper sheet 27 with the configurations of the impasto 13 formed therein is inverted and impasto put therein and covered suitably as with the lacquered burlap sheet 11 with glue or adhesive on its underside and then pressed against the burlap as by a weight or downward pressure indicated by the arrows 29 until the impasto is ready to be removed and finished as described above and such replication can be repeated at will. This sub-assembly is then re-inverted and gives the arrangement shown in FIG. 10, heat being directed as shown at 30 against film or sheet 27 to dry and harden the impasto before the sheet or film 27 is removed for the next replication.

The impasto can be composed of various substances which have been found suitable and the preferred composition of the impasto is a homogeneous mixture of fine wood flour or wood putty and sawdust containing an adhesive or gum and sufficient water to make the mass readily moldable as required and which, when molded and moisture removed, will retain the acquired configurations and curvatures. As explained above, at a certain stage in the process mild heat is applied to drive off about one-half of the water so that the impasto becomes semi-rigid and substantially permanent and it is given its final permanence and completion of the drying. It is, however, contemplated that other substances can be used for the impasto, such as low molecular synthetic plastics, which under the action of heat become more firm and solid or, alternatively, lava or marble powder can be used. I have found that those synthetic plastics known as acrylics are suitable for the impasto or I may use a slow-setting plaster.

By way of example, when a woman's head and upper body portion are the subject (as in FIG. 7), the impasto is contoured in accordance with the following:

| Head Diameter (1/6 scale) | Depth of Relief | Head Diameter (1/6 scale) | Depth of Relief |
| --- | --- | --- | --- |
| 1 in. | 2/16 in. | 4 in. | 5/16 in. |
| 1¼ in. | 2/16 in. | 4½ in. | 5/16 in. |
| 1½ in. | 3/16 in. | 5 in. | 6/16 in. |
| 2 in. | 3/16 in. | 5½ in. | 6/16 in. |
| 3 in. | 4/16 in. | 6 in. | 6/16 in. |
| 3½ in. | 4/16 in. | | |

A specific composition of impasto is composed of wood powder putty, sawdust and glue in the relative proportions of 16 oz.: 8 oz.: 4 oz. and sufficient water to form a homogeneous moldable mix.

The procedure of the invention applies particularly to studio photographs of one or more persons, usually one person, but is also applicable to the production and replication of canvas paintings, scenes, murals and commercial advertising by applying the impasto to the objects or elements of the scene and then following the above-described procedure to put them into proper relief form. The making of relief photographs according to the present invention has been designated by me as photo-reliefography. The paper for the color photograph used in the foregoing process is Eastman Ektacolor professional type C color photographic paper. This is preferred and has been found to give excellent results in the studio but it is to be understood that the invention is not limited thereto and that other or equivalent photographic paper may be used including resin coated photographic papers, linen emulsions and canvas. In addition, it has been found helpful to use Red Magic Marker or red tracing on the Saran 14 (e.g. of FIG. 2) to assist in obtaining accurate registration.

What is claimed is:

1. A process for making a tridimensional contoured color photograph or picture of natural or life-like appearance which comprises applying on a porous canvas or burlap sheet on a support base material a moistened woody moldable composition and shaping it to a representation of the photographed subject on a positive photograph of the subject, molding the composition into an accurate sculptured appearance of the subject in bas-relief, placing a wet color photograph or print on the cured, molded composition in registration with the subject and which is conformed to the shaped composition, drying the whole in stages, and coating it with a transparent lacquer.

2. A process according to claim 1, in which the composition is composed of wood powder putty or wood flour, sawdust, glue and water.

3. A process of replicating the contoured photograph resulting from claim 2 which includes applying a polyvinyl film or thin copper sheet to the contoured composition and imparting the configurations of the composition to the polyvinyl film or copper sheet which is then removed and inverted, filled with fresh composition to which pressure is applied, re-inverting the resulting assembly and applying heat thereto, and using the thus shaped composition for making a replicate of the original.

4. A process according to claim 2, in which the assemblage of base material, shaped composition on the black and white photograph, and the conformed color photograph is subjected to pressure by clamping between end panels abutting one of which is a removable mass of foam rubber which conforms to the shape imparted to the composition.

5. A process according to claim 4, in which the assemblage is subjected to the clamping pressure for about 4 minutes at 200° F without adversely affecting the shape of the composition.

6. A process according to claim 1, in which the composition is composed of wood powder putty, sawdust, glue and water in the relative proportions of 16 oz. of wood powder putty, 8 oz. of sawdust, 4 oz. of glue and sufficient water to form a homogeneous moldable mix which dries and hardens for permanence.

7. A process according to claim 1, in which the color photograph is made using professional color photographic paper.

8. The composition of claim 1 composed of a homogeneous mix in the proportion of about 16 oz. wood powder putty, 8 oz. sawdust, about 4 oz. of glue and enough water to make a moldable and sculpturable composition which dries and hardens in the shape imparted to it.

* * * * *